United States Patent
Stern et al.

(10) Patent No.: US 9,239,635 B2
(45) Date of Patent: Jan. 19, 2016

(54) METHOD AND APPARATUS FOR GRAPHICAL USER INTERFACE INTERACTION ON A DOMED DISPLAY

(71) Applicant: Spitz, Inc., Chadds Ford, PA (US)

(72) Inventors: Garland Stern, West Grove, PA (US); David Millard, Vadnais Heights, MN (US); Casey Stack, Peoria, AZ (US); Scott Huggins, West Chester, PA (US)

(73) Assignee: Spitz, Inc., Chadds Ford, PA (US)

( * ) Notice: Subject to any disclaimer, the term of this patent is extended or adjusted under 35 U.S.C. 154(b) by 0 days.

(21) Appl. No.: 13/987,379

(22) Filed: Jul. 19, 2013

(65) Prior Publication Data
US 2014/0022169 A1    Jan. 23, 2014

Related U.S. Application Data

(60) Provisional application No. 61/741,479, filed on Jul. 20, 2012.

(51) Int. Cl.
| | |
|---|---|
| *G06F 3/0346* | (2013.01) |
| *G06F 3/033* | (2013.01) |
| *G06F 3/0354* | (2013.01) |
| *G03B 21/56* | (2006.01) |

(52) U.S. Cl.
CPC ............ *G06F 3/033* (2013.01); *G06F 3/03542* (2013.01); *G03B 21/56* (2013.01)

(58) Field of Classification Search
USPC ....................................................... 345/156
See application file for complete search history.

(56) References Cited

U.S. PATENT DOCUMENTS

| | | | |
|---|---|---|---|
| 5,422,987 A | 6/1995 | Yamada | |
| 5,734,384 A | 3/1998 | Yanof et al. | |
| 7,324,085 B2 | 1/2008 | Balakrishnan et al. | |
| 7,554,541 B2 | 6/2009 | Fitzmaurice et al. | |
| 7,623,135 B1 | 11/2009 | Diamond et al. | |
| 2005/0264525 A1* | 12/2005 | Adams et al. .................. | 345/156 |
| 2006/0146015 A1* | 7/2006 | Buchmann ..................... | 345/156 |
| 2008/0036738 A1* | 2/2008 | Balakrishnan ..... | G02B 27/2271 345/158 |
| 2008/0225005 A1 | 9/2008 | Carroll | |
| 2008/0284729 A1 | 11/2008 | Kurtenbach et al. | |
| 2009/0079944 A1* | 3/2009 | Chih ............................... | 353/42 |

(Continued)

FOREIGN PATENT DOCUMENTS

WO    WO 2008/139789    11/2008

OTHER PUBLICATIONS

"Control Your Computer Using a Laser or IR Pen", at "http://www.instructables.com/id/Control-your-computer-using-a-laser-or-IR-pen/", Feb. 22, 2012 (6 pages).

(Continued)

*Primary Examiner* — Robin Mishler
(74) *Attorney, Agent, or Firm* — Panitch Schwarze Belisario & Nadel LLP

(57) ABSTRACT

A graphical user interface is implemented as a human interface device which can directly sense where on a domed screen a user is pointing. The human interface device can be an optical pointing device which emits a beam of light, preferably produced using a laser, which can be tracked by a camera appropriately located inside the dome. As an alternative, the human interface device can be a hand held device capable of tracking position and orientation. Data produced by the human interface device is then detected and mapped to the location for a corresponding cursor.

35 Claims, 2 Drawing Sheets

(56) References Cited

U.S. PATENT DOCUMENTS

2011/0205147 A1* 8/2011 Wilson et al. .................. 345/156
2013/0265571 A1* 10/2013 Bassi et al. .................... 356/127

OTHER PUBLICATIONS

Eckert, Richard R. and Moore, Jason A., "An Interactive, Remote-Controlled Computer Projection System for Use in a Large Classroom Environment", at "http://www.cs.binghamton.edu/~reckert/ictedoc.html", Feb. 22, 2012 (3 pages).

Video at "http://www.youtube.com/watch?v=Cflwfx7_360" found through "http://www.graffitiresearchlab.com/blog/projects/projection-beef/", Feb. 22, 2012 (2 pages).

"View Touch: A Laser-Controlled Interactive Technology", at "http://www.pixcom-uae.com/Products/TouchScreen_ViewTouch.htm", Feb. 22, 2012 (3 pages).

* cited by examiner

METHOD AND APPARATUS FOR GRAPHICAL USER INTERFACE INTERACTION ON A DOMED DISPLAY

BACKGROUND OF THE INVENTION

The present invention generally relates to systems for displaying images on dome-shaped screens, and in particular, to human interface devices for use with such systems.

Numerous systems have been developed for displaying images on any of a variety of dome-shaped screens. For example, hemispherical screen display systems have commonly been used in planetariums and other immersive environments. Such displays are typically 180 degrees from their front, through their topmost or zenith point to their back, although many are built with screens that are less than or greater than 180 degrees.

Such display systems have recently migrated to digital technology, leading to the need for increased interactivity with the display. Traditional human interface devices (HID's) used to operate such digital systems have, in practice, been found to be very problematic in this environment. The problems associated with such devices, for example, a computer mouse, a graphics tablet or a trackball, can be separated into two categories.

First, traditional HID's typically operate in a planar coordinate system, whereas the dome display is better suited to a spherical coordinate system. In particular, it has been found that in practice, linear movements of a mouse, for example, will not naturally produce a corresponding movement of the cursor on a domed screen. As an example, the vertical movement of a mouse will naturally move the cursor on a flat display directly from the bottom to the top of the screen. On a hemispherical screen, however, similar vertical movement of a mouse will not typically translate to a straight line path of the cursor on the screen. As a result of this, an operator will quickly find themselves very disoriented in attempting to predict how inputs from a planar HID will translate into cursor movements on the domed screen.

Second, the curved surface of a dome display makes the incremental nature of most traditional HID's problematic. On a flat screen, cursor movements shown when a user moves an HID device correspond naturally to the user's frame of reference. When a normally flat image is curved onto a dome, however, this correspondence is lost so that, for example, a movement of the HID from left to right might become a movement on the display from right to left, depending on the cursor's location on the screen.

In order for the user to place the cursor in a desired location, the user must first know the cursor's current location to determine which way to move it. This is easy to determine with a traditional computer monitor, having a substantially flat display, but much more difficult with a dome display system that is radically different from the user's frame of reference. Put simply, it is very easy on a dome display to lose track of the cursor's location. Digitizer tablets do provide a rigid mapping between the pen position and the cursor position on the display, which is helpful. However, the size and shape of the digitizer tablet still makes it very difficult for a user to translate a position on the tablet to a position on the domed screen.

SUMMARY OF THE INVENTION

In accordance with the present invention, these and other problems associated with existing HID's for dome display systems are resolved by providing a graphical user interface implemented as a human interface device which can directly sense where on a domed screen a user is pointing.

A human interface device in accordance with the present invention can be implemented as an optical pointing device which emits a beam of light, preferably produced using a laser, which can be tracked by a camera appropriately located inside the dome. With appropriate optics and software, the spot of the beam on the domed screen can be detected and mapped to the corresponding location of a rectangular computer display.

As an alternative, a hand held device which includes position and orientation tracking can be used. Such a device would be continually aware of the location, pointing direction and velocity of movement of the hand held device, which can similarly be detected and mapped to the corresponding cursor location. Examples of such devices can include Wii® controllers, SmartPhones and Air Mice. Given the state of today's technology, using such devices is currently considered to be less desirable because such use would then require regular calibration and high precision for the detection of location and acceleration in order to determine, with sufficient accuracy, the user's position and pointing direction within the domed screen area. Consequently, given the current state of the technology, the use of an optical pointing device is currently considered to be more practical. As the technology develops, however, the potential for using hand held devices is expected to increase.

For a further description of the human interface device of the present invention, reference is made to the description of preferred embodiments which is provided below, together with the following drawings.

DESCRIPTION OF PREFERRED EMBODIMENTS

Figure 1:
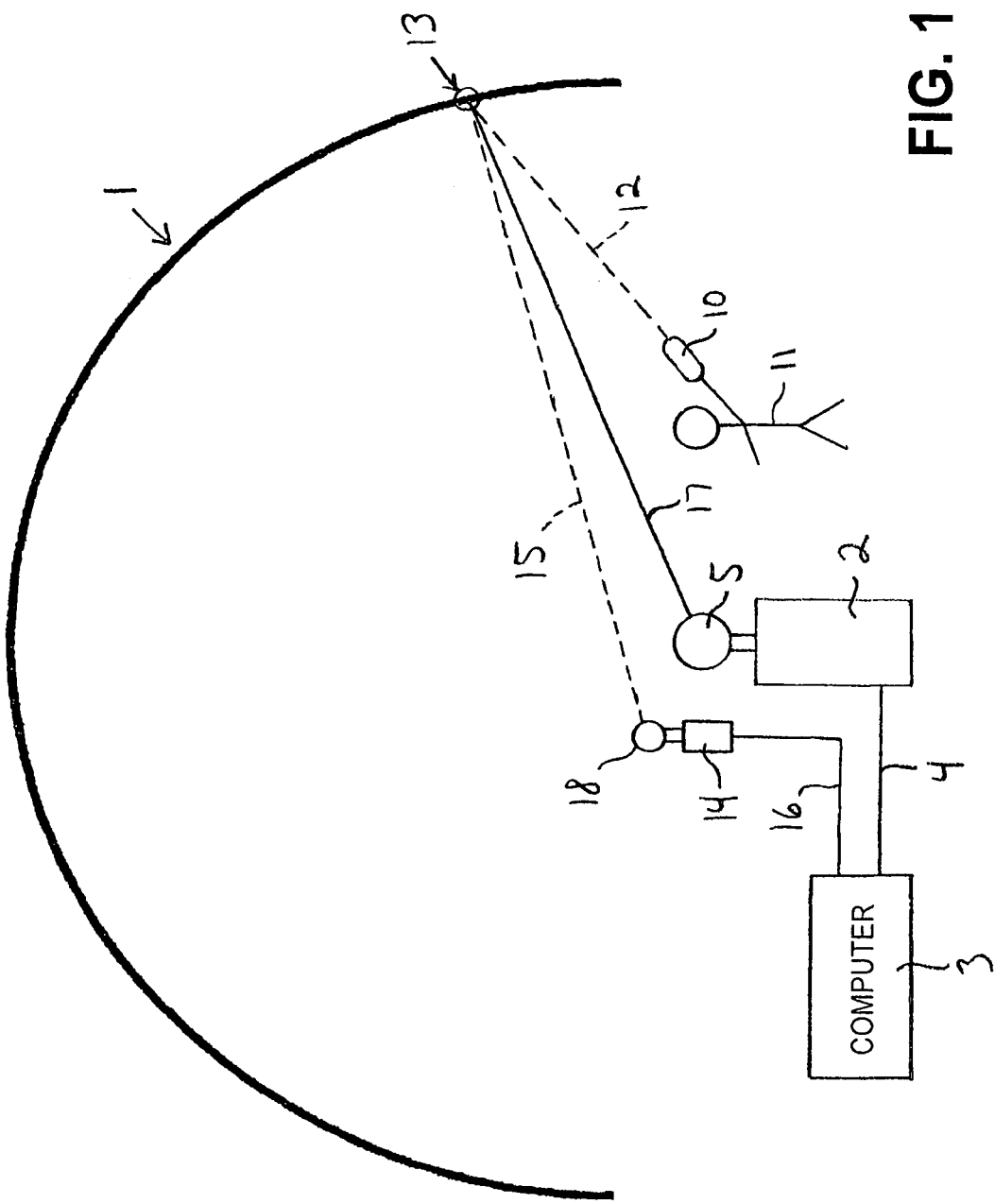
FIG. 1 is a schematic view showing a human interface device produced in accordance with the present invention.

FIG. 1 schematically illustrates an example of a system for projecting images onto a domed screen, and a human interface device in accordance with the present invention for controlling functions associated with the images projected onto the domed screen.

In the illustrated embodiment, the images are projected onto a hemispherical screen 1 using a centrally located projector 2. It is to be understood, however, that the human interface device of the present invention can also be used with other types of domed screens, and with one or more projectors which can be located at any of a variety of different locations with respect to the domed screen which is used.

For use of the display system in a digital environment, a computer 3 is coupled with the projector 2 for appropriately delivering digitally stored images to the projector 2, via the connection 4. A fisheye lens 5 is conventionally coupled with the projector 2 for the appropriate display of projected images onto the screen 1.

Interactive operation of the display system, which can include cursor movements, operational instructions, for example, to "click" on a displayed operating parameter, or other desired operations, is achieved in accordance with the present invention using a portable human interface device 10 which can be carried by a user 11, and directed at the screen 1 irrespective of the user's location within the domed space defined by the screen 1.

In the illustrated embodiment, the human interface device 10 is an optical pointing device which transmits a beam of light 12 onto the screen 1, producing a spot at 13. A camera 14 is provided for receiving signals reflected from the surface of the screen 1, for detecting the spot 13, which is schematically represented at 15, and is operationally coupled with the computer 3 via the connection 16. The connection 16 can be implemented using any of a variety of wired connections, such as a GigE, FireWire® or USB3 connection, or using wireless communications, if preferred.

As will be more fully described below, the computer 3 is a general purpose computer provided with appropriate software for detecting and mapping the spot 13 on the domed screen 1. A desired pointer, such as a cursor, can then be projected onto the screen 1, at 17, responsive to mapping of the spot 13, using the projector 2 and the fisheye lens 5.

As an alternative, the human interface device 10 can also be a hand held device incorporating a position locating circuit for transmitting position and orientation, such as a Wii® controller, SmartPhone or Air Mouse. In such case, a suitable receiver would be provided for communicating with the hand held device selected for use, which could either replace the camera 14 and communicate with the computer via the connection 16, or which could be incorporated in the computer 3, as desired.

Implementing the human interface device 10 using an optical pointing device requires various special accommodations.

For example, the extreme field of view of the display system, particularly for hemispherical screens, requires that the camera 14 have an equally wide field of view to effectively track the pointer. This makes it necessary to fit the camera 14 with a fisheye lens 18 capable of imaging the entire screen 1. This is preferably implemented with a Fujinon FE185C046HA-1 lens.

To provide acceptable resolution over a large screen, such as the hemispherical screen 1, the display system will typically employ extremely high resolution projectors. Often, more than one projector is employed to cover the entire screen surface. The cursor needs to be accurately positioned within that very high resolution image. Employing an equally high resolution camera 14 to achieve this is, however, typically impractical. The image processing computer 3 needs to process at least 20 frames per second in order to maintain smooth and responsive cursor motion, which is more difficult to achieve with extremely high resolution imagery.

For this reason, and in order to achieve an appropriate level of performance, the use of a camera such as a JAI BM-141GE C-Mount camera is presently considered to be preferred, coupled with image processing for determining the beam location with sub-pixel accuracy. This allows the cursor to be positioned with a much higher degree of accuracy than the camera would natively provide.

Such image processing is preferably implemented in software, employing the available computer 3. Sub-pixel accuracy is derived through calculation of the image centroid across multiple pixels, where:

$$\text{Centroid}(x, y) = \frac{\sum (\text{pixel coordinate}(x, y))}{\text{number of pixels}}.$$

The values for the input pixels x and y will always be integers defining a specific x and y coordinate pair on the camera's grid. The output centroid value will in most instances be a fractional number, thereby giving the desired sub-pixel accuracy.

Figure 2:
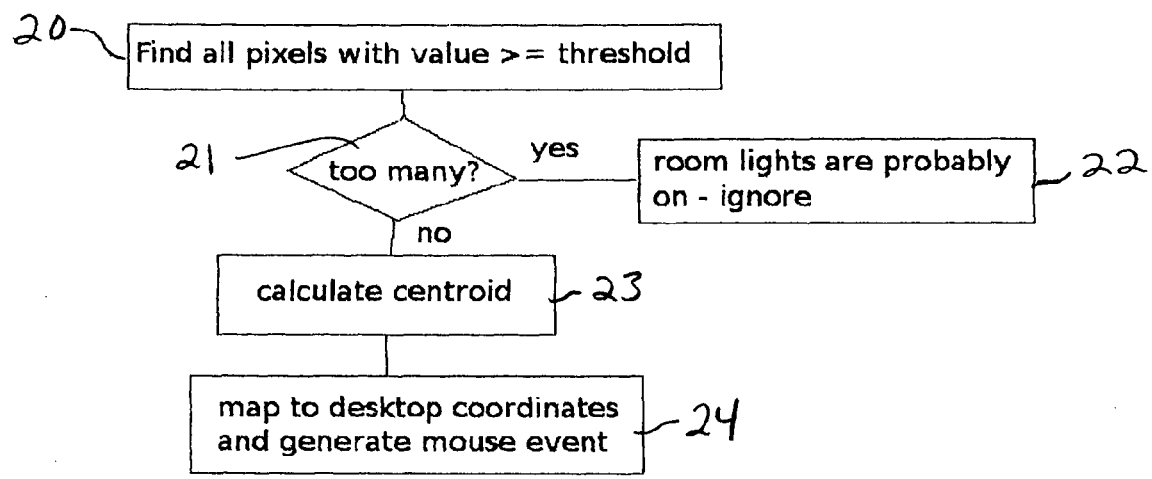
FIG. 2 is a flow chart showing image processing for implementing a human interface device produced in accordance with the present invention.

Referring to FIG. 2, prior to calculation of the image centroid, the image received by the camera 14 is first scanned, at 20, to find all pixels having a value greater than or equal to a selected threshold. If the detected number of pixels having a value greater than or equal to the selected threshold exceeds a selected number, which is determined by the test 21, the assumption is made that the room lights are on and the event is ignored, at 22. If the detected number of pixels having a value greater than or equal to the selected threshold is less than the selected number, as determined by the test 21, the image centroid is then calculated, at 23, in accordance with the above described calculation. The calculated image centroid is then suitably mapped to coordinates and a mouse event is generated, at 24, using techniques which are otherwise known.

Even with the high processing frame rate and sub-pixel accuracy which is achieved, it is anticipated that with such wide angles there will be some visible discrepancy between the spot 13 on the screen 1 and the true position for the cursor. In practice, this will only be recognizable to the user if they are able to see both the spot 13 and the displayed cursor. For this reason, it is preferable to use a source which produces light outside the visible spectrum and a camera 14 which is capable of sensing such light. The user is then unable to see the spot 13 and does not detect any slight positional deviations from the displayed cursor position. This can be accomplished using the previously specified JAI BM-141GE C-Mount camera 14, coupled with a Semrock FF01-780-12-20 filter, in combination with an infrared ("IR") laser light source 12.

In order to maximize image contrast and to minimize cross-reflectance, it is typical for spherical projection screens to be finished with a low gain surface. This is a finish which reflects only a limited amount of the incident light. Flat screens, on the other hand, are typically finished with a unity gain surface which reflects virtually all of the incident light. The lower gain finishes found on spherical projection screens (typically ranging from 38% to 80% reflective) make identifying the spot 13 considerably more difficult. To improve the ability of the camera 14 and the image processing software to discriminate the spot 13 from the background image, the camera 14 is preferably fitted with an optical filter which restricts the light reaching the camera's imaging chip to a narrow bandwidth. This allows the camera 14 to see the spot 13 without seeing the visible light associated with the projected image, or other background noise sources. This also allows the system to be operated with a Class I laser device, eliminating safety concerns for the audience and for the operator.

Because of the extremely wide field of view involved in operating a domed display, particularly for hemispherical displays, it is difficult to ensure that the only light the camera 14 will detect is light from the beam 12, such as the spot 13, as is intended when the operator is pointing at the screen 1. It is very possible, and indeed likely, that in some instances the camera 14 will see light from another source, such as a stray light source that happens to include energy inside the bandwidth of the light source used to display the spot 13 (for example, an incandescent exit light) or a reflection of the light source off of some surface other than the projection screen 1. This can lead to errors in determining the desired cursor position. To filter these undesired signals, the image processing software preferably includes a software mask which can be configured by the user to determine what portion of the camera's field of view corresponds to the surface of the screen 1. Any light detected outside of this area is ignored.

To enhance the flexibility of the foregoing system, it is preferable for the camera 14 to be capable of being positioned at any desired location within the region defined by the domed screen 1. For this reason, and to avoid the need to place the camera 14 in a single, critical position within the dome, it is preferable to provide for an adjustment of the pointer mapping based on the location selected for the camera 14. To that end, an initial calibration is performed, in software, by displaying several reference points on the screen 1 and having the user aim the beam 12 at each of the reference points, in sequence. The spot detected by the camera 14 can then be correlated with the reference points. The number of calibration points is variable, with a minimum of two. Four calibration points have been found to work well in practice. Such calibration does not need to be repeated unless the detector camera 14 is repositioned.

It will be understood that while the present invention has been described based on specific embodiments incorporating specified parts, the present invention further encompasses all enabled equivalents of the parts described, and that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for use with a projection system for displaying a plurality of images onto a domed screen, comprising:
    a portable human interface device capable of being carried by a user to varying locations within a region defined by the domed screen, and including a transmitter for direction toward a selected spot on the domed screen; and
    a receiver configured to image the entire domed screen and operationally coupled with the transmitter, for receiving signals produced by the transmitter to locate the selected spot at any location on the domed screen; and
    a computer operationally coupled with the receiver to map the selected spot onto the domed screen, wherein a pointer is projected onto the domed screen by the projection system at a position corresponding to the selected spot.

2. The apparatus of claim 1 wherein the domed screen is a hemispherical screen.

3. The apparatus of claim 1 wherein the domed screen has a low gain surface.

4. The apparatus of claim 1 wherein the pointer is projected onto the domed screen as a cursor.

5. The apparatus of claim 1 wherein the pointer performs an operational instruction.

6. The apparatus of claim 1 wherein the computer maps the selected spot onto the domed screen at a processing rate of at least 20 frames per second.

7. The apparatus of claim 1 wherein the transmitter is an optical pointing device.

8. The apparatus of claim 7 wherein the transmitter is a light source for directing a beam of light onto the domed screen.

9. The apparatus of claim 8 wherein the light source is a laser.

10. The apparatus of claim 9 wherein the laser is a Class I laser device.

11. The apparatus of claim 8 wherein the light source produces light outside the visible spectrum.

12. The apparatus of claim 8 wherein the light source emits an infrared beam.

13. The apparatus of claim 7 wherein the receiver is a camera.

14. The apparatus of claim 13 which further includes a fisheye lens coupled with the camera.

15. The apparatus of claim 13 which further includes an optical filter coupled with the camera to restrict light received by the camera.

16. The apparatus of claim 1 wherein the transmitter is a hand held device incorporating a position locating circuit.

17. The apparatus of claim 16 wherein the position locating circuit transmits position and orientation.

18. The apparatus of claim 1 wherein the selected spot is mapped onto the domed screen by mapping a centroid, wherein the $$\text{centroid } (x, y) = \frac{\sum (\text{pixel coordinate } (x, y))}{\text{number of pixels}}.$$

19. A method for detecting a position located on a domed screen, wherein a plurality of images are displayed on the domed screen using a projection system, and wherein the method comprises the steps of:
    directing a portable human interface device toward a selected spot on the domed screen corresponding to the position to be detected, wherein the portable human interface device is carried by a user to varying locations within a region defined by the domed screen, and wherein the portable human interface device includes a transmitter for direction toward the selected spot on the domed screen and a receiver configured to image the entire domed screen and operationally coupled with the transmitter for receiving signals produced by the transmitter;
    locating the selected spot at any location on the domed screen responsive to signals from the receiver using a computer operationally coupled with the receiver;
    mapping the selected spot onto the domed screen using the computer; and
    projecting a pointer onto the domed screen at the detected position using the projection system.

20. The method of claim 19 wherein the domed screen is a hemispherical screen.

21. The method of claim 19 wherein the domed screen has a low gain surface.

22. The method of claim 19 which further includes the step of projecting the pointer onto the domed screen as a cursor.

23. The method of claim 19 which further includes the step of performing an operational instruction using the pointer.

24. The method of claim 19 which further includes the step of mapping the selected spot onto the domed screen at a processing rate of at least 20 frames per second.

25. The method of claim 19 which further includes the step of mapping the selected spot onto the domed screen by mapping an image centroid across multiple pixels, wherein the $$\text{centroid } (x, y) = \frac{\sum (\text{pixel coordinate } (x, y))}{\text{number of pixels}}.$$

26. The method of claim 25 which, prior to calculating the image centroid, further includes the steps of:

scanning the received signals of an image, and identifying pixels having a value greater than or equal to a selected threshold;

detecting a number of pixels having a value greater than or equal to the selected threshold;

ignoring an event if the number of pixels having a value greater than or equal to the selected threshold exceeds a selected number; and calculating the image centroid if the number of pixels having a value greater than or equal to the selected threshold is less than the selected number.

27. The method of claim 19 which further includes the steps of configuring a software mask to determine portions of the region defined by the domed screen for displaying the plurality of images, and ignoring signals detected outside of the portions of the region defined by the domed screen for displaying the plurality of images.

28. The method of claim 19 which further includes the step of adjusting the mapping to correspond to a location for the projection system.

29. The method of claim 28 wherein the adjusting includes the steps of displaying a plurality of reference points on the domed screen, aiming the portable human interface device at each of the reference points, detecting locations for each of the reference points, and correlating the detected locations with the reference points.

30. An apparatus for use with a projection system for displaying a plurality of images onto a domed screen, comprising:

a portable optical pointing device capable of being carried by a user to varying locations within a region defined by the domed screen, and containing a light source for transmitting a beam of light toward a selected spot on a surface of the domed screen, the light source producing light outside of the visible spectrum;

a camera configured to image the entire domed screen and to receive light reflected from the surface of the domed screen to locate the selected spot at any location on the domed screen; and a computer operationally coupled with the camera to map the selected spot onto the domed screen, wherein a cursor corresponding to a position of the selected spot is projected onto the domed screen by the project on system.

31. The apparatus of claim 30 wherein the laser is a Class laser device.

32. The apparatus of claim 30 wherein the computer maps the selected spot onto the domed screen at a process ng rate of at least 20 frames per second.

33. The apparatus of claim 30 wherein the selected spot is mapped onto the domed screen by mapping a centroid, wherein the $$\text{centroid } (x, y) = \frac{\sum (\text{pixel coordinate } (x, y))}{\text{number of pixels}}.$$

34. The apparatus of claim 1, wherein the receiver is physically separate from the human interface device.

35. The apparatus of claim 30, wherein the camera is physically separate from the portable optical pointing device.

* * * * *